(12) United States Patent
Nommensen et al.

(10) Patent No.: US 11,813,911 B2
(45) Date of Patent: Nov. 14, 2023

(54) SUSPENSION MOUNT FOR AN AUTOMOTIVE VEHICLE

(71) Applicant: Monroe Truck Equipment, Inc., Monroe, WI (US)

(72) Inventors: Daniel Nommensen, Monroe, WI (US); Eric Falsey, Monroe, WI (US); Nick Wiegmann, Monroe, WI (US)

(73) Assignee: Monroe Truck Equipment, Inc., Monroe, WI (US)

( * ) Notice: Subject to any disclaimer, the term of this patent is extended or adjusted under 35 U.S.C. 154(b) by 0 days.

(21) Appl. No.: 17/896,536

(22) Filed: Aug. 26, 2022

(65) Prior Publication Data

US 2023/0060561 A1 Mar. 2, 2023

Related U.S. Application Data

(60) Provisional application No. 63/238,347, filed on Aug. 30, 2021.

(51) Int. Cl.
*B60G 11/28* (2006.01)
*B60G 11/27* (2006.01)

(52) U.S. Cl.
CPC ............ *B60G 11/28* (2013.01); *B60G 11/27* (2013.01); *B60G 2202/152* (2013.01); *B60G 2206/601* (2013.01)

(58) Field of Classification Search
CPC .. B60G 11/28; B60G 11/27; B60G 2202/152; B60G 2206/601
See application file for complete search history.

(56) References Cited

FOREIGN PATENT DOCUMENTS

| DE | 202013009134 U1 * | 5/2014 | ............. B60G 11/27 |
| EP | 940320 A1 * | 9/1999 | ............. B60G 15/12 |
| EP | 3228485 A1 * | 10/2017 | ........... B60G 13/003 |

* cited by examiner

*Primary Examiner* — Faye M Fleming
(74) *Attorney, Agent, or Firm* — Quarles & Brady LLP (57) ABSTRACT

An automotive vehicle mount includes a frame that has a cross beam, a longitudinally extending first side frame rail, and a longitudinally extending second side frame rail. Each of the frame rails includes mounting holes for a suspension system. The automotive vehicle mount further includes a first side mount bracket mounted to the first frame rail and a second side mount bracket mounted to the second frame rail. The automotive vehicle mount further includes a first air bag pivotally mounted to the first side mount bracket to support the cross beam, and a second air bag pivotally mounted to the second side mount bracket to support the cross beam.

20 Claims, 6 Drawing Sheets

302 — REMOVING A RUBBER MOUNT FROM A FRAME OF A VEHICLE, INCLUDING REMOVING ONE OR MORE FASTENERS FROM ONE OR MORE MOUNTING HOLES ON THE FRAME

304 — SECURING A MOUNTING BRACKET TO THE ONE OR MORE MOUNTING HOLES

306 — SECURING AN AIR BAG TO A CROSS BEAM AND TO THE MOUNTING BRACKET

308 — CONNECTING THE AIR BAG TO AN AIR COMPRESSOR SYSTEM OF THE VEHICLE

310 — CONNECTING A VALVE PIVOT ARM WITH A LENGTH OF BETWEEN ABOUT 4 INCHES AND ABOUT 9 INCHES TO THE AIR COMPRESSOR SYSTEM OF THE VEHICLE

FIG. 6

SUSPENSION MOUNT FOR AN AUTOMOTIVE VEHICLE

CROSS-REFERENCE TO RELATED APPLICATIONS

This application claims priority to U.S. Provisional Patent Application No. 63/238,347, filed Aug. 30, 2021, titled "Suspension Mount for an Automotive Vehicle," the entirety of which is incorporated herein by reference.

BACKGROUND

Suspension mounts for automotive vehicles can be important in a variety of contexts. In some settings, suspension mounts may be used underneath a cab of a truck to reduce bumps and jolts that a driver or passenger may otherwise experience.

SUMMARY

The present invention relates generally to automotive vehicle mounts, and more specifically, in some embodiments, to suspension mounts that include a frame, brackets, air bags, and a compressor valve assembly that may be retrofitted onto an automotive vehicles.

Some embodiments of the invention provide an automotive vehicle mount to be mounted to a vehicle frame with first and second frame rails and a cross beam coupled to a vehicle cab. The vehicle mount can include a first side mount bracket mounted to and extending laterally outward from the first frame rail. A second side mount bracket can be mounted to and extend laterally outward from the second frame rail opposite the first side mount bracket. A first air bag can be pivotally mounted to and between the first side mount bracket and the cross beam. A second air bag can be pivotally mounted to and between the second side mount bracket and the cross beam.

Some embodiments of the invention provide automotive vehicle mount. The vehicle mount can include a frame with a first frame rail and a second frame rail. Each of the first and second frame rails can include mounting holes. A center mount can extend from an inner wall of the first frame rail to an inner wall of the second frame rail. A cross beam can be positioned above and extend over and beyond the first and second frame rails. A first side mount bracket can be mounted to the mounting holes of the first frame rail and laterally outward from the first frame rail. A second side mount bracket can be mounted to the mounting holes of the second frame rail and laterally outward from the second frame rail opposite the first side mount bracket. A first air bag can be pivotally mounted to and between the first side mount bracket and the cross beam. A second air bag can be pivotally mounted to and between the second side mount bracket and the cross beam.

Some embodiments of the invention provide a method for retrofitting a vehicle suspension. The method can include removing a rubber mount from a frame of a vehicle, including removing one or more fasteners from one or more mounting holes on the frame. The method can further include securing a mounting bracket to the one or more mounting holes. The method can further include securing an air bag to a cross beam and to the mounting brackets. The method can further include connecting the air bag to an air compressor system of the vehicle.

BRIEF DESCRIPTION OF THE DRAWINGS

The accompanying drawings, which are incorporated in and form a part of this specification, illustrate embodiments of the invention and, together with the description, serve to explain the principles of embodiments of the invention.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The terms "about" and "approximately," as used herein, refer to variations in the numerical quantity that may occur, for example, through typical measuring and manufacturing procedures; through inadvertent error in manufacturing processes; through difference in the manufacture, source, or materials used to make the articles of manufacture described herein; and the like. Throughout the disclosure, the terms "about" and "approximately" may refer to a range of values±5% of the numerical values that the term proceeds. Accordingly, about 100 refers to a range between 95 and 105, inclusive.

As used herein, unless otherwise specified, "air bag" refers to an air bag of a suspension system for vehicles, including components also referred to by those of skill in the art, such as, for example, "air springs."

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

As noted above, suspension mounts can be widely used in automotive applications. Further, it may be useful to provide an automotive vehicle mount that is durable and reduces bumps and jolts that a driver or passengers may otherwise experience in a cab of an automotive vehicle (e.g., a cab of a car, truck, or other on-highway vehicle). However, as manufactured, conventional automotive vehicle mounts may use rubber stoppers that are located axially between the automotive vehicle frame rails, fatigue over time, and occupy a large amount of space underneath the automotive vehicle. Further, existing automotive vehicle mounts may fail to provide a comfortable ride that reduces bumping and jolting movements for drivers, passengers, or items in a cab of a vehicle. Therefore, it may be useful to provide an improved suspension mount for an automotive vehicle that creates a comfortable ride for drivers and passengers, utilizes an ergonomic design, and that is durable.

Embodiments of the invention can address these and other issues. Generally, in some embodiments of the invention, an automotive vehicle mount may include air bags to provide an improved suspension mount. In some cases, the air bags can be located outside of frame rails of the automotive vehicle to provide comfort to a driver or passenger (e.g. by reducing bumps or jolts in the cab of the automotive vehicle), while providing a durable ergonomic design.

More specifically, in some embodiments, an automotive vehicle mount can include a frame having a cross beam, a longitudinally extending first side frame rail, and a longitudinally extending second side frame rail (e.g., the frame rails of the automotive vehicle body as originally assembled). Each of the frame rails may include mounting holes for a suspension system (e.g., mounting holes that may already be present from removing a factory assembled suspension system). The automotive vehicle mount may further include a first side mount bracket mounted to the first frame rails and a second side mount bracket mounted to the second side frame rail, a first air bag pivotally mounted to the first side mount bracket to support the cross beam, and second air bag pivotally mounted to the second side mount to support the cross beam. The automotive vehicle mount may further include a center mount that extends from an inner wall of the right side frame rail to an inner wall of the left side frame rail. The automotive vehicle mount may further include a compressor valve assembly disposed along the center mount with a pivot arm that is configured to activate a compressor valve that regulates air flow from an air compressor.

Figure 1:
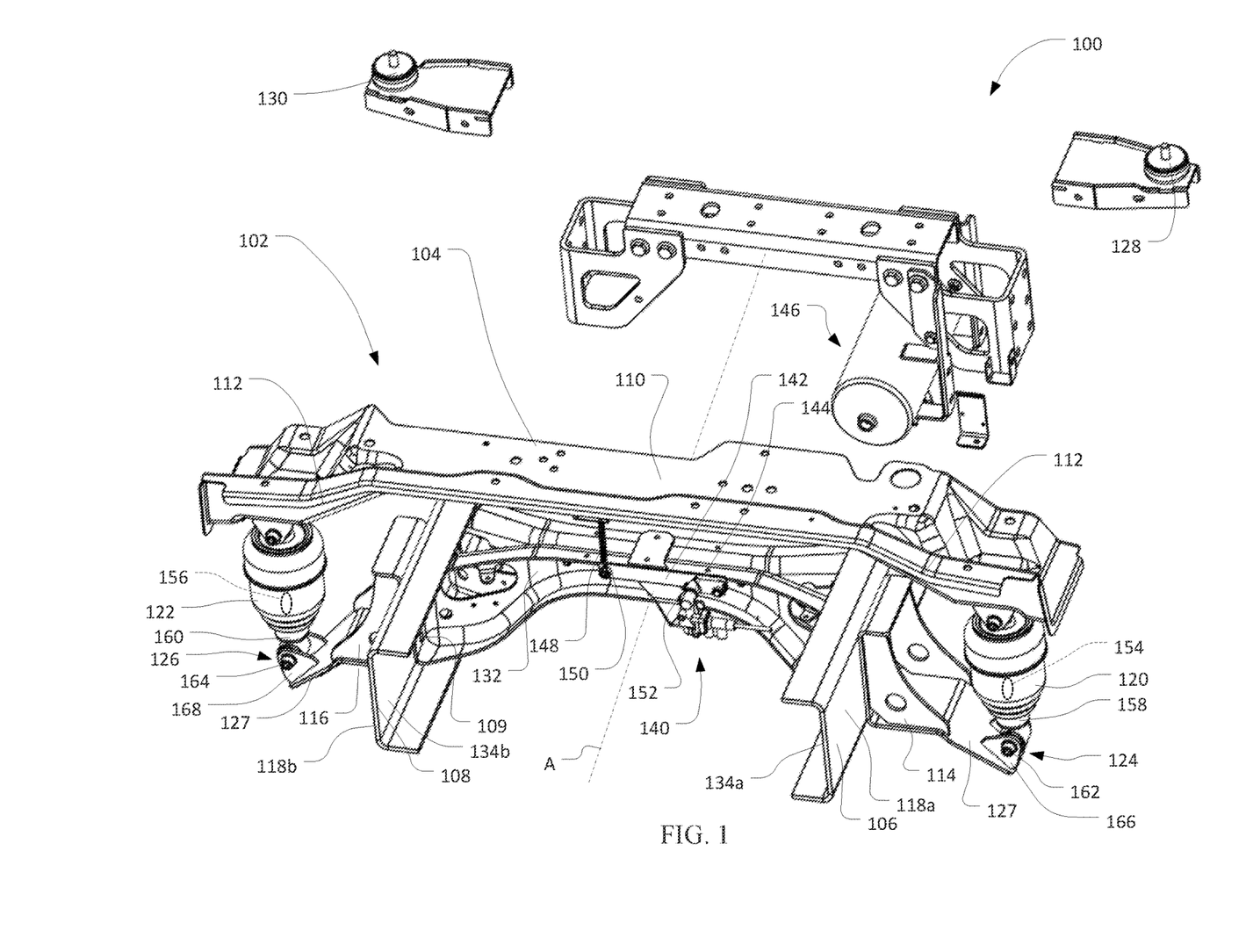
FIG. 1 is a top, front, and right isometric view of an automotive vehicle mount, according to an embodiment of the invention.
Figure 2:
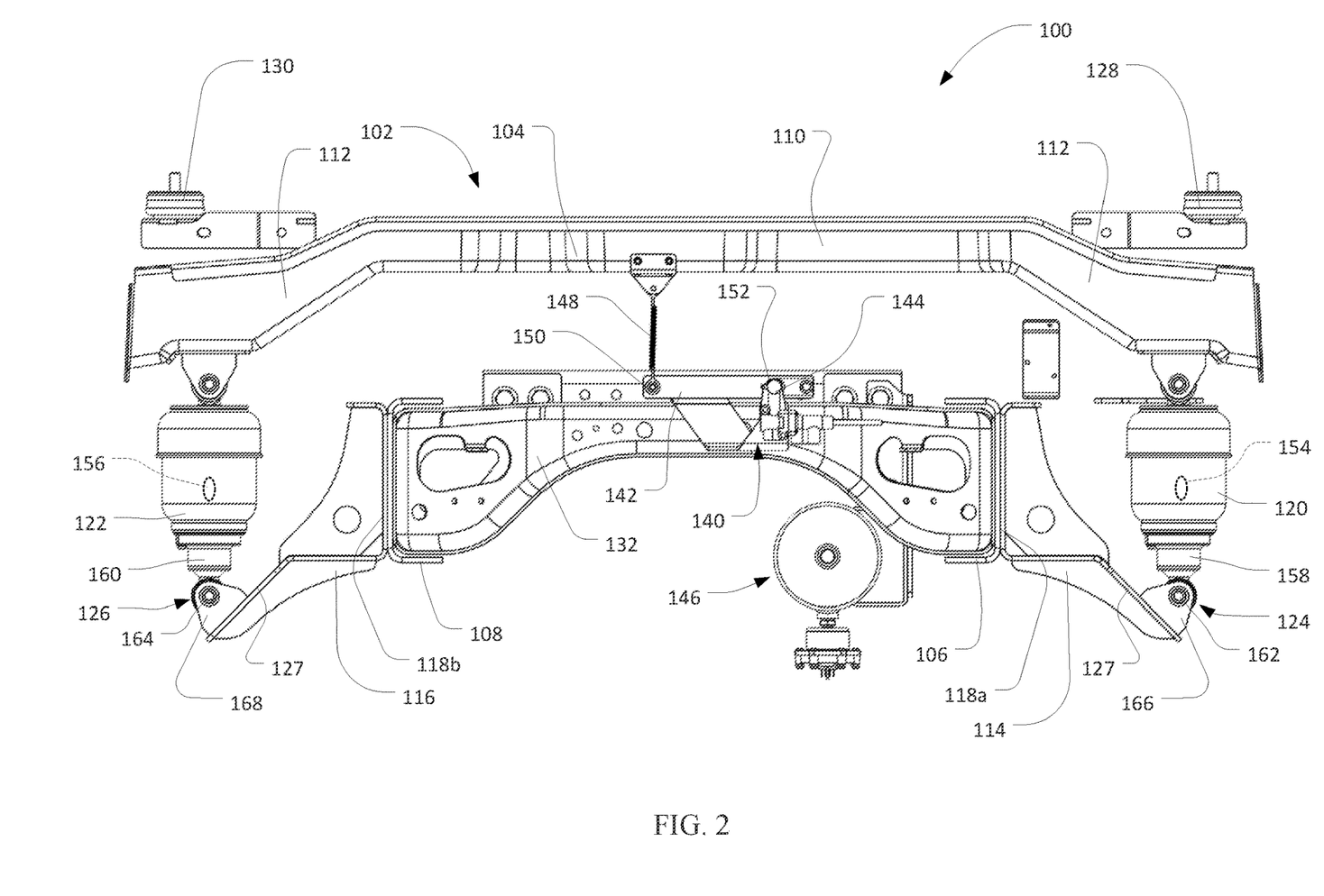
FIG. 2 is a front elevation view of the automotive vehicle mount of FIG. 1.
Figure 3:
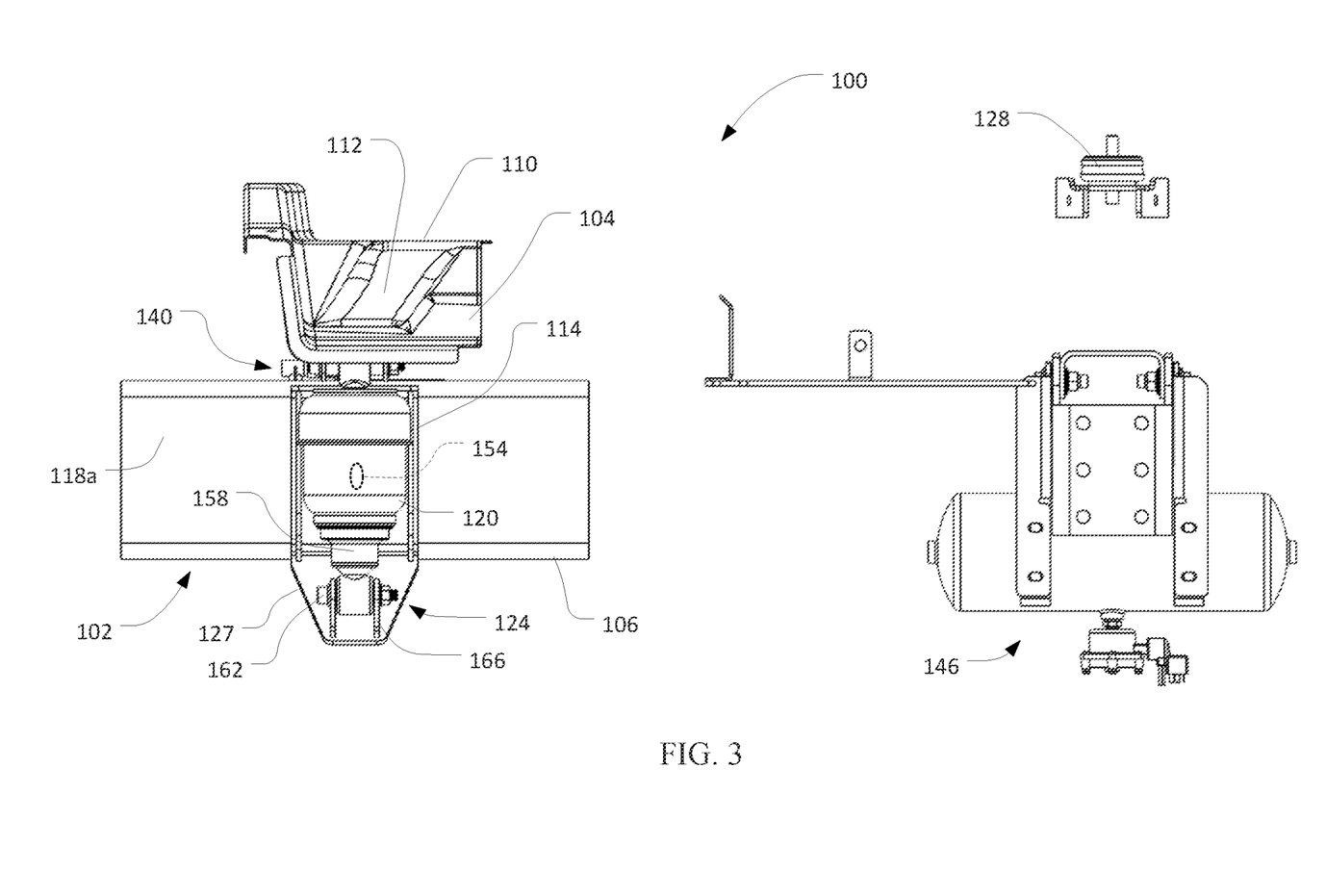
FIG. 3 is a right side elevation view of the automotive vehicle mount of FIG. 1.

FIGS. 1 through 3 illustrate an example automotive vehicle suspension mount 100 (also generally referred to as a vehicle suspension mount or a vehicle mount), according to one embodiment of the invention. In some configurations, the automotive vehicle mount 100 can be used in conjunction with a truck or service vehicle (not shown) to create a smoother driving experience for drivers or passengers being transported in the truck or service vehicle. It is noted that FIG. 1 is a simplified view of the automotive vehicle mount 100 that highlights elements of the claimed invention. Other known components of a vehicle chassis and associated systems are not necessarily shown, for clarity.

In the embodiment illustrated, the vehicle mount 100 includes a frame 102 that has a cross beam 104, a first (e.g., right) side frame rail 106, and a second (e.g., left) side frame rail 108. The first and second side frame rails 106, 108 are longitudinally extending and include mounting holes 109 for a suspension system (not shown). As used in this application, the term "longitudinally" refers to a direction along a central axis A that extends from a center point on a front of an automotive vehicle to a center point on a rear of the automotive vehicle (e.g., a primary direction of forward or backward travel of the automotive vehicle). Conversely, the term "laterally" refers to a direction orthogonal to the central axis A and parallel to ground that the automotive vehicle may travel along (e.g., level ground).

The first side and second side frame rails 106, 108 may define a c-shaped channel with ends that point laterally inward (i.e. a notch formed by the c-shaped channel may face the central axis A). The cross beam 104 may include a central raised portion 110 with opposing outward portions 112 that slope downward and outward from the central raised portion 110. The configuration of the cross beam 104 to include the opposing outward portions 112 allows for additional structural components to be attached to the opposing outward portions, outside of the frame rails 106, 108, while also allowing the additional structural components to be easily serviced and assembled. Furthermore, the opposing outward portions 112 may curve away from the central raised portion 110 to efficiently dissipate forces along the curved structure. It will be recognized that dissipating forces along a curve can be beneficial both for the durability of the vehicle mount 100, and its purpose to provide comfort to drivers or passengers by reducing forces applied to a cab of a vehicle.

The automotive vehicle mount 100 further includes a first side mount bracket 114 mounted to the first frame rail 106, and a second side mount bracket 116 mounted to the second frame rail 108. The first and second side mounts 114, 116 may be disposed on laterally opposed outer side walls 118 of the frame rails 106, 108, including a first outer side wall 118a of the first frame rail 106, and a second outer wide wall 118b, of the second frame rail 108. The first and second side mounts 114, 116 may extend downwardly and outwardly from the first and second frame rails, respectively. Therefore, the first and second side mounts 114, 116 may generally mimic the outward and downward slope of the opposing outward portions 112.

The first and second side mount brackets 114, 116, as well as the frame 102 may be made of a high strength low alloy steel. Such a material choice can contribute to the durability of the vehicle mount 100, because the vehicle mount 100 may be subject to a variety of variable loading forces. In other embodiments of the invention, the first and second side mount brackets 114, 116, as well as the frame 102 may be made of other durable metals or plastics.

The automotive vehicle mount 100 further includes a first set of air bags including a first air bag 120 pivotally mounted to the first side mount bracket 114 to support the cross beam 104 relative to the frame rail 106, and a second (e.g., lower) air bag 122 pivotally mounted to the second side mount bracket 116 to support the cross beam 104 relative to the frame rail 108. The first and second air bags 120, 122 are pivotally connected to the opposing outward portions 112 of the cross beam 104 (e.g., using pinned connections of known configurations). Further, the first and second air bags 120, 122 are disposed to the outside of the first and second frame rails 106, 108, respectively.

Each of the lower air bags 120, 122 may include a bump stop 154, 156 and a shock 158, 160. Thus, the lower air bags 120, 122 are generally incorporated with the vehicle mount 100 to limit transfer of energy from bumpy or jerky travel to the cab of a vehicle. The lower air bags 120, 122 contribute to the advantage of the vehicle mount 100 being able to provide a comfortable ride for persons or items being transported in a vehicle by absorbing kinetic energy from uneven or sudden forces applied to the vehicle. Furthermore, it is noted that by placing the first and second air bags 120, 122 on the outside of the first and second frame rails 106, 108, the first and second air bags 120, 122, are effectively positioned to absorbs large force moments (i.e. the physical definition of force moments) that may otherwise be applied to a cab of a vehicle.

In some cases, an optimal spacing can be provided between air bags of a suspension system in order to appropriately balance considerations of performance, packaging, etc. In particular, in the illustrated embodiment, the first and second side mount brackets 114, 116 may support the first and second air bags 120, 122 with a distance of between about 40 inches and about 65 inches between the first and second air bags 120, 122, as measured between a first pivotal connection 124 between the first air bag 120 and the first side mount bracket 114 and a second pivotal connection 126 between the second air bag 122 and the second side mount bracket 116. Alternatively, in some embodiments of the invention, the first and second air bags 120, 122 may be a distance of between about 50 inches and about 55 inches apart from each other, as measured between the first pivotal connection 124 and the second pivotal connection 126.

In some cases, improved performance can also result from appropriate location of support connections for air bags of a suspension system. For example, the first and second pivotal connections 124, 126 may be below the first and second frame rails 106, 108. Further, each of the first and second pivotal connections 124, 126 may include a pinned joint 162, 164 at a set of ears 166, 168 that extend from a downwardly angled support surface 127 of the first or second side mount bracket 114, 116 respectively. The pinned joints 162, 164 may be, for example, a 14 mm grade 12.9 pin joint. The first and second pivotal connections 124, 126 may be spaced laterally outward from the first and second frame rails 106, 108, respectively, between about 8 inches and about 12 inches. Positioning the first and second air bags 120, 122 outside of the first and second frame rails 106, 108 can also provide additional stability. For example, traditional cab air ride systems include a torque rod that restricts lateral movement within the system. By mounting the first and second air bags 120, 122 outward from the first and second from the first and second frame rails 106, 108, lateral movement is significantly reduced, eliminating the need for a torque rod.

Generally, the first set of air bags 120, 122 may be disposed below the cross beam 104 (i.e., with the term "below" referring to a direction toward a ground that the vehicle would travel along). The automotive vehicle mount may further include a second set of air bags including a third air bag 128 and a fourth air bag 130. The third and fourth air bags 128, 130 may generally be rearward of the first and second air bags 120, 122, to support a portion of a relevant cab (e.g., an extended cab, not shown) that extends rearward from the portion of the cab positioned over the cross beam 104. Further, the third and fourth air bags 128, 130 may be disposed above the cross beam 104 (i.e., with the term "above" referring to a direction away from a ground that the vehicle would travel along). In some cases, including as illustrated for the third and fourth air bags 128, 130, the second set of air bags (or other sets of air bags) may not include a bump stop or a shock.

The vehicle mount 100 may further include a center mount 132 that extends from an inner wall 134a of the left side frame rail 106 to an inner wall 134b of the right side frame rail 108 (see FIG. 1). The center mount 132 may generally taper (e.g., curve) inward from each of the first and second frame rails 106, 108 to the central axis A. The inward taper of the center mount 132 can help to dissipate forces and contribute to improved packaging overall for the design of the vehicle mount 100.

In some cases, a center mount can also support other components of a suspension system, including to provide improved load balancing. For example, a compressor valve assembly 140 may be disposed along the center mount 132 (e.g., centrally disposed, as shown). The compressor valve assembly 140 may include a valve pivot arm 142 that is configured to activate a compressor valve 144 that regulates air flow from an air compressor 146. Therefore, the compressor valve pivot arm 142 may be configured to control operation of the compressor valve 144, as will be discussed further below. The air compressor 146 may be an electric air compressor in some cases (e.g., as powered by a battery of the vehicle). Further, tubing, piping, or other fittings of generally known configurations (not shown) may carry air from the air compressor 146 to the compressor valve 144. In some cases, as appropriate, a pneumatic accumulator can also be provided.

In some cases, a pivot arm to control pneumatic flow for a suspension system can be sized with an optimal length, to provide an appropriate balance of capabilities for load balancing, durability, and packaging considerations. In this regard, for example, the valve pivot arm 142 may have a length of between about 4 inches and about 9 inches, or of between about 5 inches and about 8 inches, or of between about 6 inches and about 7 inches.

In some cases, a linkage with one or more rigid or other links can be coupled to a pivot arm to convey force signals from a cross beam to the pivot arm. For example, a linkage 148 may be pivotally connected to the cross beam 104 and to the valve pivot arm 142. The linkage 148 may be configured to move the valve pivot arm 142 to actuate the compressor valve 144. Thus, for example, the valve pivot arm 142 may include a first end connection 150 that receives a weight force from the cross beam 104 (e.g., via the linkage 148, as shown), and a second end connection 152 that actuates the compressor valve 144 (e.g., directly, as shown). The linkage 148 may translate vertically upward a distance of between about 0.5 inches and about 1.0 inches, or about 0.75 inches from an at-rest state. Further, the linkage 148 may translate vertically downward a distance of between about 0.25 inches and about 0.75 inches, or about 0.5 inches from an at-rest state. The vertical translation of the linkage 148 may be due to a vertical translation of a height of a cab of a vehicle with respect to the ground (such as, for example, when a weight is added or removed from the cab due to a loading or unloading of people or items). In this regard, the vertical translation of the linkage 148 may be caused partly by an elastic deformation of the cross beam 104 and partly by movement of the cross beam, as supported by the side rails 106, 108 via the mounts 114, 116, as caused by a weight force applied to the cross beam 104.

As also noted above, a pivot arm may sometimes be sized with an optimal length. Further in this regard, a distance between the first and second end connections 150, 152 may be between about 5 inches and about 8 inches, or about 6 inches and about 7 inches. Thus, the valve pivot arm 142, as measured between action points, is generally longer than conventional valve pivot arms, as may help to reduce the sensitivity of the valve pivot arm 142 for controlling the compressor valve 144. Generally, by increasing the length of a valve pivot arm, the angular rotation of a compressor valve is decreased. Therefore, embodiments of the present invention use a valve pivot arm that is about twice as long as some known valve pivot arms to decrease the amount of air that the compressor valve assembly 140 uses by about half, thereby improving efficiency of the compressor valve assembly 140 (or other compressor components, as applicable).

The air compressor 146 may control a pressure of each of the first and second air bags 120, 122 to be in a range of between about 25 psi and about 85 psi, or about 30 psi and about 80 psi, or about 35 psi and about 75 psi. Alternatively, according to some embodiments of the invention, the air compressor 146 may be configured to turn on when a pressure of each of the first and second air bags 120, 122 is about 20 psi or more (e.g., about 25 psi or more, about 30 psi or more, about 35 psi or more, or about 40 psi or more). Conversely, the air compressor 146 may turn off when a pressure of each of the first and second air bags 120, 122 is about 65 psi or more (e.g., about 70 psi or more, about 75 psi or more, about 80 psi or more, or about 85 psi or more).

Conventional electric air compressors may control air pressure to be in a range of between 110 psi and 130 psi, which may demand a substantial amount of energy. Accordingly, operation of the air compressor 146 according to the embodiment of the present invention described above can help to conserve energy. Conventional electric air compressors that may be found on automotive vehicles also typically require more energy to compress air because they are often coupled to, for example, air horns, which typically require an air pressure of about 120 psi to function appropriately. However, the air compressor 146 of the present invention has been modified to conserve energy, while supplying air pressure directly (e.g., and only) to the air bags 120, 122, 128, and 130.

An air pressure of each of the four air bags 120, 122, 128, 130 may be regulated through the same compressor valve 144. Therefore, each of the four air bags 120, 122, 128, 130 may have the same air pressure. Alternatively, it is contemplated that if there were multiple compressor valves, then each of the air bags could have different air pressures depending on the compressor valve to which each air bag is connected.

Figure 4:
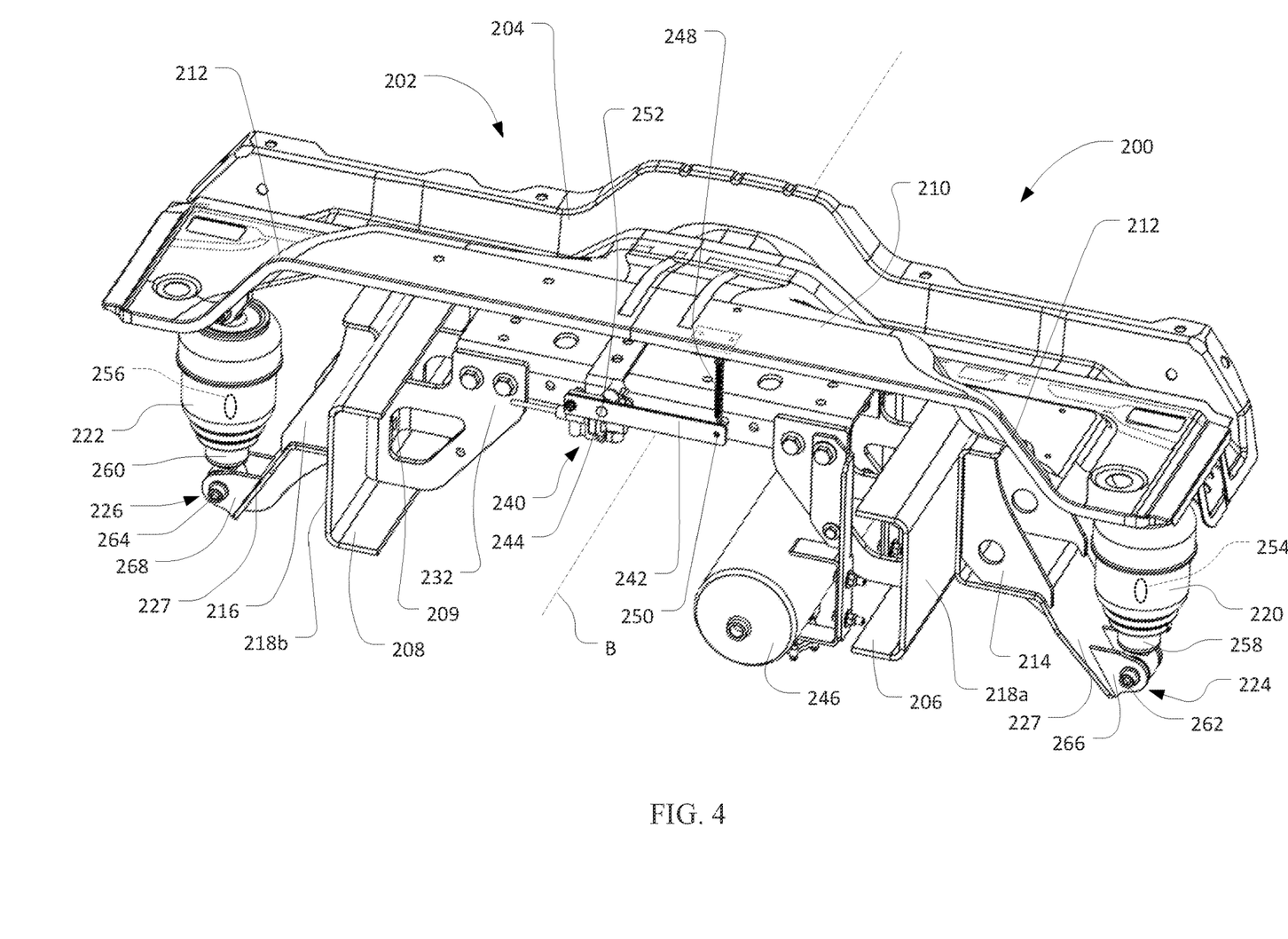
FIG. 4 is a top, front, and right isometric view of an automotive vehicle mount, according to another embodiment of the invention.
Figure 5:
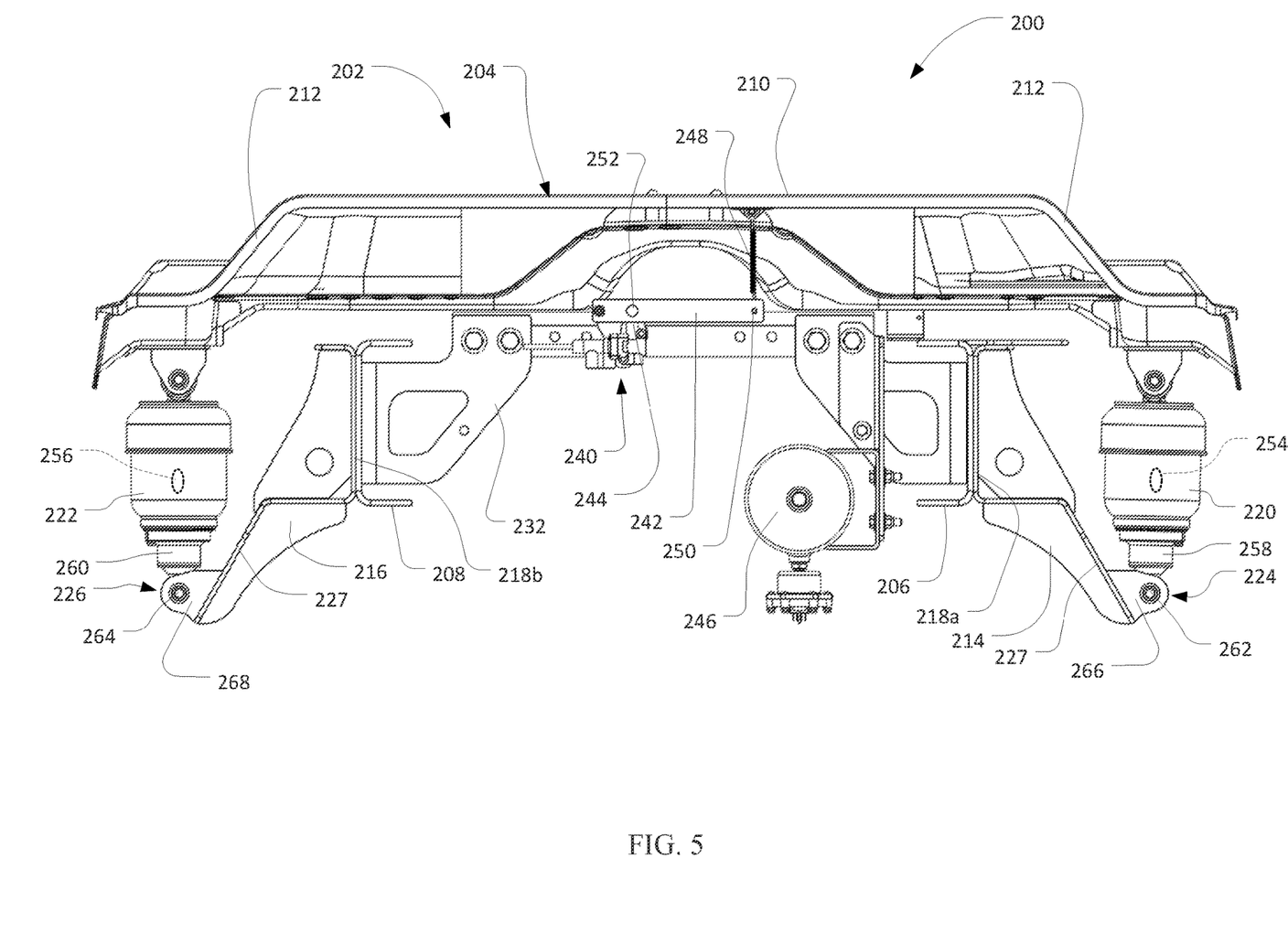
FIG. 5 is a front elevation view of the automotive vehicle mount of FIG. 4.

FIGS. 4 and 5 illustrate another example automotive vehicle mount 200, according to one embodiment of the invention. The vehicle mount 200 is generally similar to the vehicle mount 100, and similar numbering is used to describe similar structure between the vehicle mount 100 and the vehicle mount 200. For example, the vehicle mount 200 includes a central axis B, a frame 202, a cross beam 204, a first side frame rail 206, a second side frame rail 208, mounting holes 209, a central raised portion 210, outward portions 212, a first side mount bracket 214, a second side mount bracket 216, a first outer side wall 218*a*, a second outer side wall 218*b*, a first lower air bag 220 with a bump stop 254 and a shock 258, a second lower air bag 222 with a bump stop 256 and a shock 260, a first pivotal connection 224 with a pinned joint 262 at a set of ears 266 extending from a downwardly angled support surface 227 of the first side mount bracket 114, a second pivotal connection 226 with a pinned joint 264 at a set of ears 268 that extend from a downwardly angled support surface 227 of the second side mount bracket 216, a center mount 232, a compressor valve assembly 240, a valve pivot arm 242, a compressor valve 244, an air compressor 246, a linkage 248, a first end connection 250, and a second end connection 252.

In some ways, the vehicle mount 200 is different than the vehicle mount 100. For example, the vehicle mount 200 has only two air bags 220, 222, instead of four air bags. Thus, in some cases, for example, the vehicle mount 200 can be used with a vehicle that has a shorter cab than a vehicle on which the vehicle mount 100 is installed. Additionally, the air compressor 246 is located directly underneath the cross beam 204, instead of the air compressor 146, which is located below and to the rear of the cross beam 104 in the vehicle mount 100. In particular, the air compressor 246 may be coupled to the center mount 232, as may provide improved packaging for smaller vehicles. Other differences between the vehicle mount 200 and the vehicle mount 100 may also be apparent to artisans of ordinary skill in view of FIGS. 1 through 3 (showing vehicle mount 100) compared to FIGS. 4 and 5 (showing vehicle mount 200).

In some implementations, devices or systems disclosed herein can be used, manufactured, or installed using methods embodying aspects of the invention. Correspondingly, any description herein of particular features, capabilities, or intended uses of a device or system is generally intended to include disclosure of a method of using such devices for the intended purposes, of a method of otherwise implementing such capabilities, of a method of manufacturing relevant components of such a device or system (or the device or system as a whole), and of a method of installing disclosed (or otherwise known) components to support such purposes or capabilities. Similarly, unless otherwise indicated, discussion herein of any method of manufacturing or use for a particular device or system, including installing the device or system, is intended to inherently include disclosure, as embodiments of the invention, of the utilized features and configurations, and implemented capabilities of such device or system.

Figure 6:
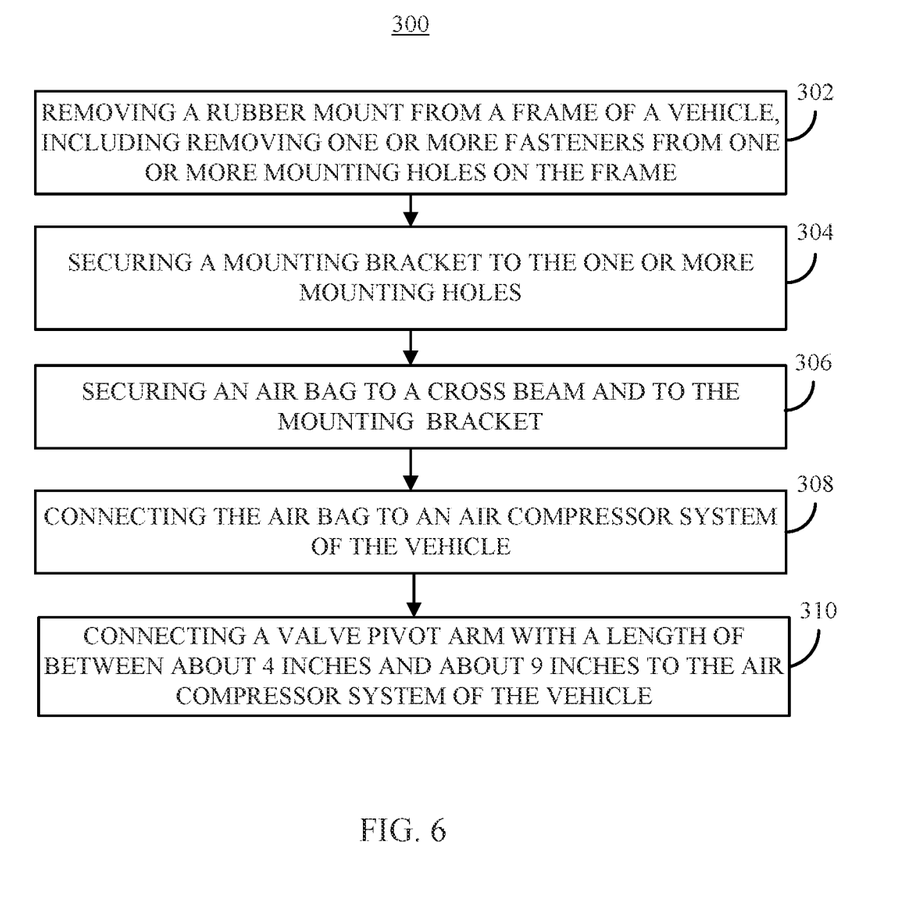
FIG. 6 is a flowchart of a method for retrofitting a vehicle suspension, according to an embodiment of the invention.

In this regard, for example, FIG. 6 illustrates an example method 300 for retrofitting a vehicle suspension. In some cases, the method 300 can be implemented using the vehicle mount 100 or the vehicle mount 200. In other cases, the method 300 can be implemented with other vehicle mounts. Generally, the method 300 can be executed via manual installation. In some cases, the method 300 can be implemented using an automated assembly process.

The method 300 may include removing 302 a rubber mount from a frame of a vehicle, including removing one or more fasteners from one or more mounting holes (e.g., the mounting holes 109) on the frame (e.g., the first and second side frame rails 106, 108). The method 300 may further include securing 304 a mounting bracket (e.g., the first and second side mounts 114, 116) to the one or more mounting holes. Generally, this method may thus be used to replace a factory assembled vehicle suspension system with an improved vehicle suspension system without necessarily requiring the machining of new mounting holes on a frame.

The method 300 may further include securing 306 an air bag (e.g., the first and second air bags 120, 122) to a cross beam (e.g., the cross beam 104) and to the mounting bracket(s). The method 300 may further include connecting 308 the air bag to an air compressor system (e.g., the air compressor 146 and the compressor valve 144) of the vehicle. In some embodiments, the method 300 may further include connecting 310 a valve pivot arm (e.g., the valve pivot arm 142) with a length of between about 4 inches and about 9 inches to the air compressor system of the vehicle and the cross beam.

Generally, embodiments of the invention, including the automotive vehicle mount 100 or 200, and the method 300, can be used to create a more comfortable experience for drivers or passengers in a cab of an automotive vehicle. In addition to providing a comfortable experience for drivers and passengers, embodiments of the invention can help to efficiently regulate air flow to air bags, thereby conserving energy.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

Various features and advantages of the invention are set forth in the following claims.

What is claimed is:

1. An automotive vehicle mount to be mounted to a vehicle frame with first and second frame rails and a cross beam coupled to a vehicle cab, comprising:
    a first side mount bracket mounted to and extending laterally outward from the first frame rail;
    a second side mount bracket mounted to and extending laterally outward from the second frame rail opposite the first side mount bracket;
    a first air bag pivotally mounted to and between the first side mount bracket and the cross beam; and
    a second air bag pivotally mounted to and between the second side mount bracket and the cross beam.

2. The automotive vehicle mount of claim 1, wherein the first and second side mount brackets are mounted to mounting holes in the respective first and second frame rails.

3. The automotive vehicle mount of claim 1, wherein each of the first and second air bags includes a bump stop and a shock.

4. The automotive vehicle mount of claim 1, wherein the first and second side mount brackets extend downwardly and outwardly from the first and second frame rails, respectively.

5. The automotive vehicle mount of claim 1, wherein the side mount brackets laterally space the first and second air bags apart a distance between about 40 inches and about 65 inches, as measured between a first pivotal connection between the first air bag and the first side mount bracket and a second pivotal connection between the second air bag and the second side mount bracket.

6. The automotive vehicle mount of claim 5, wherein the distance between the first and second pivotal connections is between about 50 inches and about 55 inches.

7. The automotive vehicle mount of claim 5, wherein the first and second pivotal connections are laterally spaced outward from the first and second frame rails, respectively, a distance between about 8 inches and about 12 inches.

8. The automotive vehicle mount of claim 5, wherein the first and second pivotal connections are located below the first and second frame rails.

9. The automotive vehicle mount of claim 8, wherein each of the first and second pivotal connections includes a pinned joint at a set of ears that extend from a downwardly angled support surface of the first or second side mount, respectively.

10. The automotive vehicle mount of claim 1, further comprising a compressor valve assembly that includes a compressor valve pivot arm secured to the cross beam and configured to activate a compressor valve that regulates air flow from an air compressor to the first and second air bags based on movement of the vehicle cab relative to the first and second frame rails.

11. The automotive vehicle mount of claim 10, wherein the pivot arm includes a first end attached to the cross beam and a second end attached to the compressor valve; and
    wherein a distance between the connections of the first and second ends to the respective cross beam and compressor valve is between about 5 inches and about 8 inches.

12. The automotive vehicle mount of claim 1, wherein the first and second air bags form a first set of air bags, the first set of air bags are disposed below the cross beam; and
    the automotive vehicle mount further comprising a second set of air bags, including a third and a fourth air bag, wherein the second set of air bags are disposed rearward of the first set of air bags.

13. The automotive vehicle mount of claim 12, wherein the second set of air bags is disposed vertically above the cross beam.

14. The automotive vehicle mount of claim 12, wherein the air pressure within the first and second sets of air bags is regulated through a common compressor valve, which provides the same air pressure to each of the first, second, third, and fourth air bags.

15. An automotive vehicle mount, comprising:
    a frame including a first frame rail, a second frame rail, wherein each of the first and second frame rails includes mounting holes, and a center mount extending from an inner wall of the first frame rail to an inner wall of the second frame rail;
    a cross beam positioned above and extending over and beyond the first and second frame rails,
    a first side mount bracket mounted to the mounting holes of the first frame rail and laterally outward from the first frame rail;
    a second side mount bracket mounted to the mounting holes of the second frame rail and laterally outward from the second frame rail opposite the first side mount bracket;
    a first air bag pivotally mounted to and between the first side mount bracket and the cross beam; and
    a second air bag pivotally mounted to and between the second side mount bracket and the cross beam.

16. The automotive vehicle mount of claim 15, further comprising:
    a compressor valve assembly disposed along the center mount, the compressor valve assembly including a valve pivot arm configured to activate a compressor valve that regulates air flow from an air compressor to the first and second air bags; and
    a linkage pivotally connected to and between the cross beam and the valve pivot arm, the linkage moves the valve pivot arm to actuate the compressor valve.

17. The automotive vehicle mount of claim 16, wherein the pivot arm is between about 4 inches and about 9 inches in length.

18. The automotive vehicle mount of claim 16, wherein the air compressor maintains a pressure of each of the first and second air bags to be in a range of between about 25 psi to about 85 psi.

19. A method for retrofitting a vehicle suspension, the method comprising:
    removing a rubber mount from a frame of a vehicle, including removing one or more fasteners from one or more mounting holes on the frame;
    securing a mounting bracket to the one or more mounting holes;
    securing an air bag to a cross beam and to the mounting bracket; and connecting the air bag to an air compressor system of the vehicle.

20. The method of claim 19, further comprising connecting a valve pivot arm with a length of between about 4 inches and about 9 inches to the air compressor system of the vehicle.

\* \* \* \* \*